(12) United States Patent
Jahanbanifar et al.

(10) Patent No.: US 9,432,301 B2
(45) Date of Patent: *Aug. 30, 2016

(54) DEFINING DISJOINT NODE GROUPS FOR VIRTUAL MACHINES WITH PRE-EXISTING PLACEMENT POLICIES

(71) Applicant: TELEFONAKTIEBOLAGET L M ERICSSON (PUBL), Stockholm (SE)

(72) Inventors: Azadeh Jahanbanifar, Montreal (CA); Maria Toeroe, Montreal (CA)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 534 days.

This patent is subject to a terminal disclaimer.

(21) Appl. No.: 13/872,680

(22) Filed: Apr. 29, 2013

(65) Prior Publication Data

US 2014/0325036 A1    Oct. 30, 2014

(51) Int. Cl.
G06F 15/177    (2006.01)
H04L 12/911    (2013.01)
G06F 9/50    (2006.01)

(52) U.S. Cl.
CPC .......... H04L 47/70 (2013.01); G06F 9/5077 (2013.01)

(58) Field of Classification Search
CPC ............................. G06F 9/5077; H04L 47/70
USPC ................................................. 709/220, 223
See application file for complete search history.

(56) References Cited

U.S. PATENT DOCUMENTS 7,555,544 B1    6/2009    Rattner et al.
2008/0275973 A1*    11/2008    Toeroe ........................ 709/223
2009/0274157 A1    11/2009    Jayasimha et al.
2012/0240129 A1    9/2012    Kanso et al.
2014/0317620 A1*    10/2014    Farkas et al. ..................... 718/1

FOREIGN PATENT DOCUMENTS

WO    WO-2011069664    6/2011

OTHER PUBLICATIONS

Service Availability Forum Application Interface Specification, "Availability Management Framework," SAI-AIS-AMF-B.04.01, The Perl Foundation, reissued Sep. 30, 2011, 452 pages.
Service Availability Forum Application Interface Specification, "Cluster Membership Service," SAI-AIS-CLM-B.04.01, The Perl Foundation, reissued Sep. 30, 2011, 84 pages.
(Continued)

*Primary Examiner* — Joseph E Avellino
*Assistant Examiner* — Marshall McLeod
(74) *Attorney, Agent, or Firm* — Nicholson, De Vos, Webster & Elliot, LLP

(57) ABSTRACT

Disjoint node groups are generated for a node cluster to guarantee hardware redundancy for each service group to be configured on the node cluster. Each service group includes service units, and each service unit is a unit of redundancy for services provided and protected by the service group. Hardware dependency is identified between virtual machines in the node cluster and hardware elements to host the virtual machines. A first node group set (NG set) is formed using a first criterion to select the virtual machines into different node groups based on the hardware dependency, such that there is no common hardware element between any two node groups in the first NG set. The first NG set is mapped to a first set of service groups. Different node groups of the first NG set are mapped to different service units in each service group of the first set of service groups.

18 Claims, 8 Drawing Sheets

(56) References Cited

OTHER PUBLICATIONS

Service Availability Forum Application Interface Specification, "Overview," SAI-Overview-B.05.03, The Perl Foundation, reissued Sep. 30, 2011, 68 pages.

Service Availability Forum Application Interface Specification, "Platform Management Service," SAI-AIS-PLM-A.01.02, The Perl Foundation, reissued Sep. 30, 2011, 186 pages.

Extended European Search Report, Counterpart European Patent Application No. 14001399.6, dated Mar. 23, 2016, 7 pages.

Machida, et al., "Redundant virtual machine placement for fault-tolerant consolidated server clusters," Network Operations and Management Symposium (NOMS), IEEE, Apr. 19, 2010, pp. 32-39.

* cited by examiner

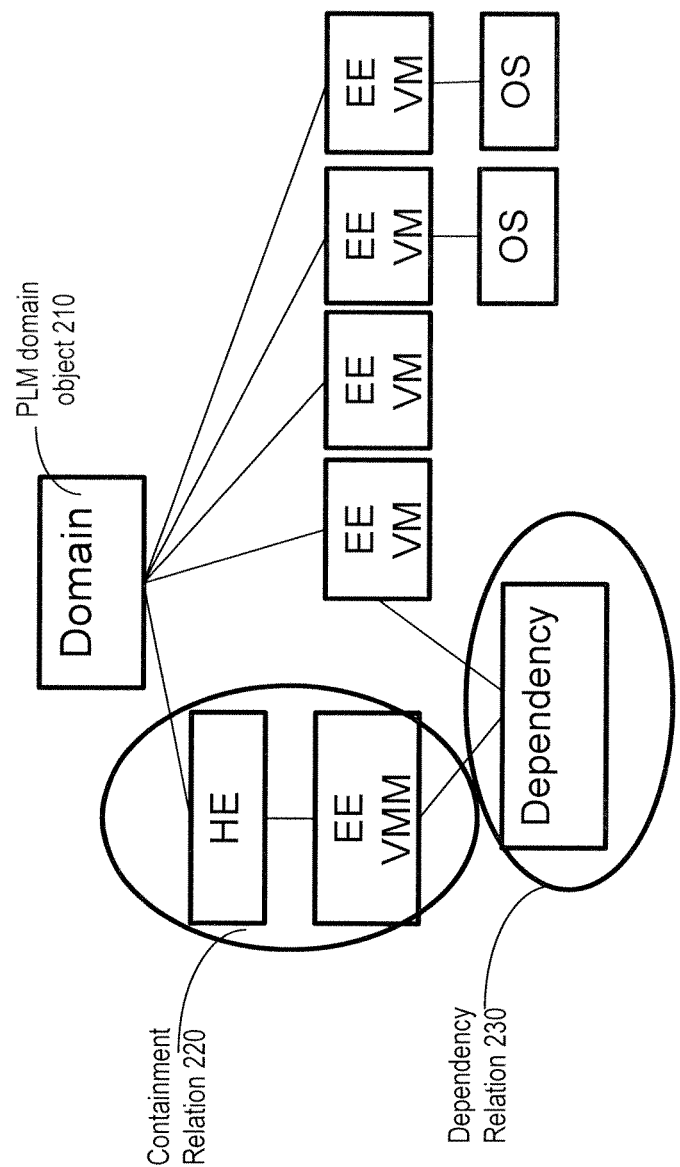

| | VMM1 | VMM2 | VMM3 | VMM4 | VMM5 |
|---|---|---|---|---|---|
| V1 | HE1 | HE2 | | | |
| V2 | HE1 | | HE3 | | HE5 |
| V3 | | HE2 | HE3 | | |
| V4 | | | | HE4 | HE5 |
| V5 | HE1 | | | HE4 | |
| V6 | | HE2 | HE3 | | |

FIG. 5    Figure 5 : Flow chart of the first algorithm for defining disjoint NGs Flow chart of the second algorithm for defining disjoint NGs

DEFINING DISJOINT NODE GROUPS FOR VIRTUAL MACHINES WITH PRE-EXISTING PLACEMENT POLICIES

TECHNICAL FIELD

Embodiments of the invention relate to platform management for highly available services; and more specifically, to providing hardware redundancy for highly available services in virtualized or cloud architectures.

BACKGROUND

The Service Availability Forum (SA Forum) is a consortium of industry-leading companies promoting a set of open specifications that enables the creation and deployment of highly available, mission critical services. As a standardization body, the SA Forum has defined a set of open specifications for middleware services including the Application Interface Specification (AIS) (SA Forum, Service Availability Interface, Overview, SAI-Overview-B.05.03) which consists of different services to enable and manage high availability services. Service availability in the AIS architecture is provided by using software and hardware redundancy techniques.

The Availability Management Framework (AMF) is one of the AIS services that supports and manages service availability by coordinating and managing redundant software entities within a cluster. A cluster is a logical cluster that includes a number of cluster nodes (also referred to as "nodes"). These nodes host various resources in a distributed computing environment. An application that is managed by the AMF to provide service availability is structured into logical entities according to the model expected by the AMF.

The AMF manages redundant service units to ensure service availability in case of failures. These redundant service units are grouped into a service group to guarantee service availability for a particular set of service instances. Each service instance represents workload incurred by the provision of services. At runtime the AMF assigns each service instance to a set of service units; some of the service units actively provide the associated service, and the other service units may standby to protect the service in case of a failure of the active service units.

Accordingly, if the service units of a service group that participate in the provisioning and protecting of a service instance are placed on the same hardware, the failure of this hardware causes all these service units to fail and the service associated with the service instance is interrupted. Therefore, there is a need to protect against the impact of hardware failures to ensure service availability.

SUMMARY

Embodiments of the invention provide a method and a system for generating disjoint node groups for a node cluster. The use of disjoint node groups guarantees hardware redundancy for each service group to be configured on the node cluster. Each service group includes service units, and each service unit is a unit of redundancy for services provided and protected by the service group.

In one embodiment, a method of generating disjoint node groups for a node cluster is described. The method identifies hardware dependency between virtual machines in the node cluster and hardware elements to host the virtual machines. A first node group set (NG set) of node groups is formed using a first selection criterion to select the virtual machines into different node groups based on the hardware dependency, such that there is no common hardware element between any two of the node groups in the first NG set. The first NG set is mapped to a first set of the service groups. Different node groups of the first NG set are mapped to different service units in each service group of the first set of the service groups.

In another embodiment, a computer system is described. The computer system comprises a processor and a memory. The memory contains instructions executable by the processor, whereby the computer system is operative to perform the method of generating disjoint node groups for a node cluster as described above.

BRIEF DESCRIPTION OF THE DRAWINGS

The present invention is illustrated by way of example, and not by way of limitation, in the figures of the accompanying drawings in which like references indicate similar elements. References in the disclosure to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 2 illustrates a simplified model of a Platform Management (PLM) configuration according one embodiment.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for defining disjoint node groups to ensure hardware redundancy. The node groups are defined using an existing platform management setup that supports virtualization and virtual machine (VM) migration. Each node group includes one or more nodes, where each node represents or corresponds to one VM. Two node groups are disjoint if they do not have (or more precisely, do not depend on) any hardware element (HE) in common. Based on the hardware dependencies among the nodes, disjoint node groups are created and then used by the AMF to configure and instantiate service units within a service group. Different service units within a service group are mapped to different node groups to ensure hardware redundancy for the service instance that is assigned to the different service units. Providing hardware redundancy is crucial for highly available services.

The mechanism may be used in a virtualization environment, where operations of the service units are performed by VMs. The resulting AMF configuration can be deployed on a system provider's system; for example, a cloud computing provider's system.

The mechanism provided herein enables the distribution of the service units of a service group on different HEs in disjoint node groups. If the service units of a service group that participate in the provisioning of a service instance are placed on the same hardware, the failure of this hardware causes the interruption of the service instance. The examples of FIGS. 1A and 1B illustrate the scenarios of having disjoint node groups versus having non-disjoint node groups.

Figure 1B:
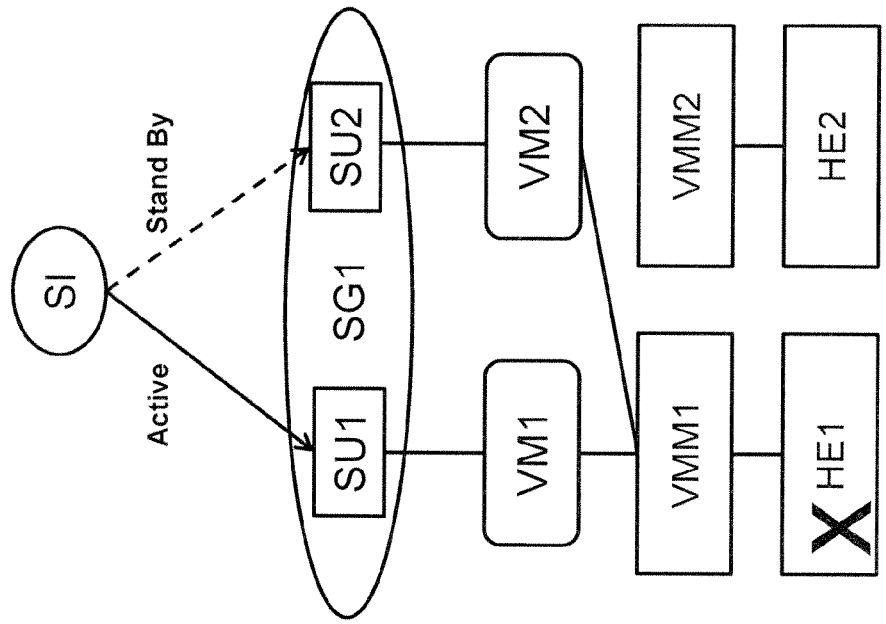
FIG. 1B illustrates an example of a service instance assignment that is not protected by hardware redundancy according to one embodiment.
Figure 1A:
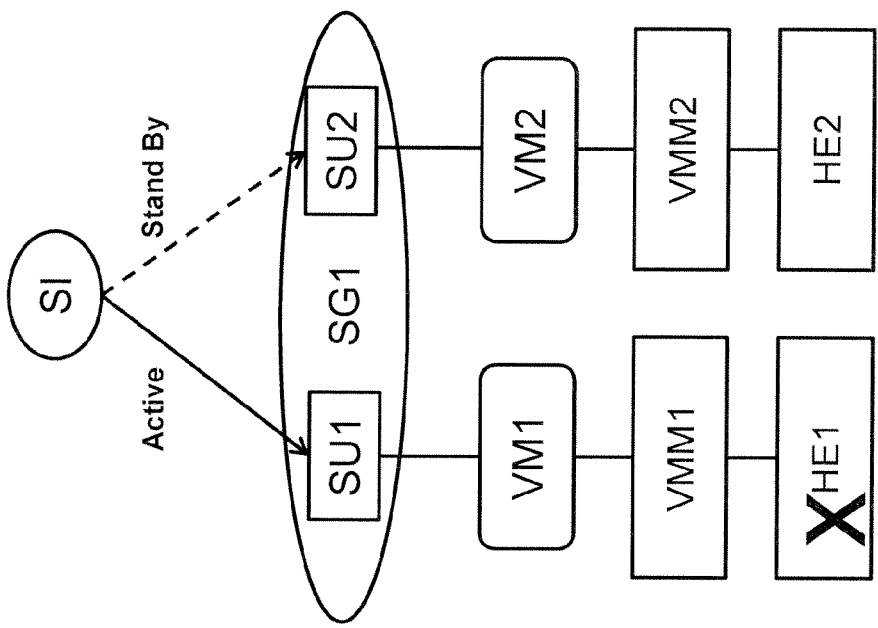
FIG. 1A illustrates an example of a service instance assignment protected by hardware redundancy according to one embodiment.

FIG. 1A is a block diagram illustrating an example of a service instance SI assigned to an active service unit SU1 and a standby service unit SU2 in a service group SG. In this example, SU1 is mapped to VM1 hosted on a virtual machine monitor (or hypervisor) VMM1, which is in turn hosted on a hardware element HE1. SU2 is mapped to VM2 hosted on VMM2, which is in turn hosted on a hardware element HE2. If HE1 fails, the assignment of SI can failover to SU2 on VM2 and HE2. As there is no hardware dependency (i.e., no common hardware element) between VM1 and VM2, the node group of VM1 is disjoint from the node group of VM2; therefore, hardware redundancy is guaranteed in the assignment of SI.

FIG. 1B is a block diagram illustrating another example of the same SI assigned to SU1 and SU2. In this example, both VM1 and VM2 are hosted on VMM1, which in turn is hosted on HE1. Although SU1 and SU2 are mapped to different VMs, if HE1 fails, both SU1 and SU2 will fail because VM1 and VM2 have or depend on the same hardware element HE1. In the example of FIG. 1B, the node group of VM1 and the node group of VM2 are not disjoint because these two node groups depend on a common hardware element HE1. There, hardware redundancy is not guaranteed in the assignment of SI.

One embodiment of the invention provides multiple approaches for defining disjoint node groups that can host redundant entities of a node cluster. The approaches can be used in conjunction with the AMF or any other application that manages software redundancy. Thus, service availability is immunized against not only software failures but also hardware failures.

Before describing the mechanism for defining disjoint node groups in detail, it is helpful to explain some basic concepts relating to AMF configurations. In addition to the AMF, the AIS also defines a Cluster Membership (CLM) service. The CLM service is responsible for the formation and maintenance of a node cluster. All of the AIS services including the AMF use only nodes admitted to the node cluster by the CLM and rely on the CLM for the current membership information. A CLM node hosts an AMF node. An AMF node is a logical entity that represents a complete inventory of all AMF entities that are configured to be hosted on a CLM node.

The Platform Management (PLM) service is yet another AIS service which is responsible for providing a logical view of hardware (i.e., HEs) and low-level software including operating systems (OSs) and virtualization layers (referred to as Execution Environments (EEs)) to other services including the CLM. This logical view is provided through the PLM configuration, as part of the information model of the SA Forum.

FIG. 2 illustrates an example of a simplified model of a PLM configuration that includes a hierarchical structure of PLM entities (HEs and EEs) under a PLM domain object 210. All of the VMs and HEs are direct children of the PLM domain object 210. VMMs are children of the HEs hosting the VMMs. In this simplified model, the relation among the PLM entities can be defined in two ways. The first relation among the PLM entities is a containment relation 220, e.g., an HE object (e.g., hardware) contains an EE object (e.g., a VMM) when the VMM is hosted on the hardware. The second relation among the PLM entities is a dependency relation 230, which is defined through a PLM dependency class in the PLM configuration model. This PLM dependency class includes the name of the dependant object, the names of sponsor objects, and the number of sponsors that should be present and actively sponsor dependent entities such that the dependent entity can provide service. The term "to sponsor" as used herein means "to provide service or support." With respect to virtualization, the PLM configuration model can be refined to distinguish the PLM EE objects that represent an OS instance, a VM or a VMM.

To allow VM migration, the EEs representing VMs can be placed in the PLM configuration model as children of the PLM domain object. Each such VM can host one OS instance, which in turn may host a CLM node. The VMMs eligible for hosting a given VM are listed in a dependency object associated with the VM. This means that the PLM and the underlying virtualization layer can migrate the VM among the listed VMMs.

The mapping of AMF node, CLM node and PLM EE is one to one. In the following description, the term "node" or "cluster node" means an AMF node which is mapped on a CLM node that resides on a VM (which is a PLM EE). As used herein, the terms "node" and "VM" are used interchangeably, and the term "node group" refers to a group of VMs.

Given a PLM configuration, disjoint node groups are defined and used by the AMF to configure service units at the AMF level. Having a definition of disjoint node groups eliminates the need for the AMF to interpret the details of the PLM configuration model. Furthermore, having a definition of disjoint node groups allows VM migration between HEs at the PLM level independently from the AMF.

In one embodiment, one or more node group sets (NG-sets) are defined and formed based on the information of the PLM configuration for a node cluster. Each NG-set includes a number of disjoint node groups. Each NG-set can be used to configure a service group by configuring the node groups of the NG-set for the different service units of the service group. This way hardware redundancy is provided for the service units of a service group. The number of node groups in the NG-set determines the number of service units in the service group for which hardware redundancy can be provided with the given NG-set.

In one embodiment, an NG-set is defined for a given PLM configuration using a criterion for selecting VMs into different node groups. The NG-set can be used by one or more service groups that are configured on the node cluster having the given PLM configuration. In one embodiment, for a given PLM configuration, more than one criterion can used to define multiple different NG-sets. The different NG-sets can be used to configure different service groups of the same node cluster, thus improving VM utilization as well as hardware utilization.

To define the NG-sets, a starting point is the PLM configuration containing the information about HEs, EEs and their types and relations, where EEs representing VMs are located directly under the PLM domain object and the VMMs eligible for hosting each VM is listed in the dependency object of the VM. On the other hand, VMMs are represented in the PLM configuration as leaf EEs of the branches that contain HEs as ancestors to these EEs.

In one embodiment, the information of the PLM configuration can be organized in a table or another data structure, which shows the relation of nodes to the HEs. The table is used to group VMs with different hosting HEs. From the PLM dependency objects in the PLM configuration, the VMMs hosting the VMs can be identified, and from the VMMs' ancestors in the PLM configuration, the HEs that each VM has (i.e., depends on) can be identified. This information is referred to as "hardware dependency" and can be expressed in a hardware dependency table or another data structure.

Figures 3, 4:
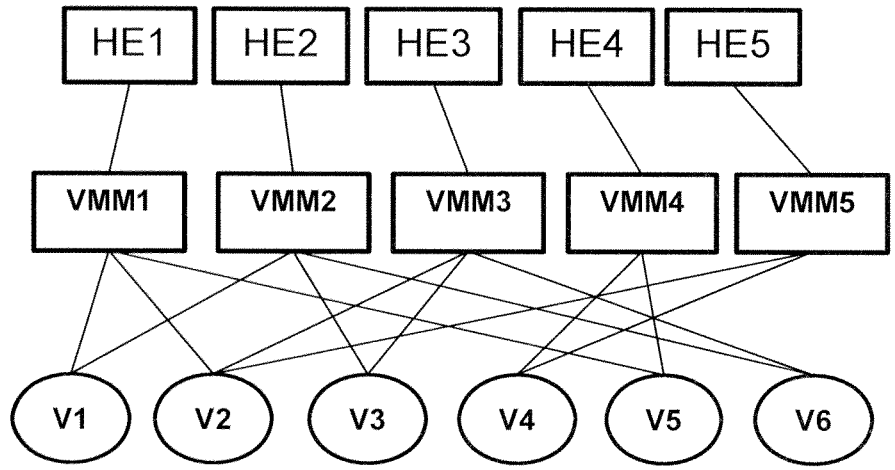
FIG. 3 illustrates an example of a PLM configuration according one embodiment.
FIG. 4 illustrates an example of a hardware dependency table according to one embodiment.

FIG. 3 illustrates an example PLM configuration according to one embodiment. In this example, the containment relation is shown as the connections between HEs and VMMs. The dependency relation is shown as the connections between VMMs and VMs (V1-V6). The example shows that a VM can migrate between the VMMs that are hosted on different HEs. FIG. 4 shows an example of a hardware dependency table constructed from the PLM configuration of FIG. 3. The columns of the table represent the VMMs and their hosting HEs, which is the ancestor HE of a VMM. In reality there may be many ancestor HEs for a VMM; e.g., a hosting HE may be a board of a blade system where there are different shelves in a cabinet. In this case, each of the hardware aggregation can be shown as an ancestor HE having many children HEs. For example, from the top level the cabinet HE has many shelf HEs, each of which has many blade HEs. The HE analyzed here should be the ancestor HE the failure of which needs to be tolerated, and the failure of against which needs to be protected. In the example of FIG. 4, VMM1 is hosted on HE1, VMM2 hosted on HE2 and VMM3 and VMM4 both hosted on HE3. The rows of the table represent the VMMs eligible for hosting the VMs based on their dependency information. For example, V1 can be hosted by VMM1 or VMM3, and accordingly on HE1 or HE3. V2 can be hosted on VMM1 or VMM2, and accordingly on HE1 or HE2.

From these relations of the VMs with HEs, one or more NG-sets can be defined with each NG-set including disjoint NGs. Two example methods for defining NG-sets are described below with reference to the flow diagrams of FIG. 5 and FIG. 6. The two methods use different criteria for selecting VMs into node groups. The criteria are different with respect to the characteristics of the hardware dependency used for selecting the VMs. Although two methods are described, it is understood that additional methods exist that use additional different criteria for selecting VMs into node groups. Some of these methods may produce the same NG-set. Some of these methods may produce different NG-sets. Some of these methods may produce a more balanced NG-set (with respect to the number of HEs and/or VMs in each node group) than some of the other methods. The duplicated NG-set and the NG-set that is overly unbalanced (e.g., an NG-set having only one node group) can be left unused.

Figure 5:
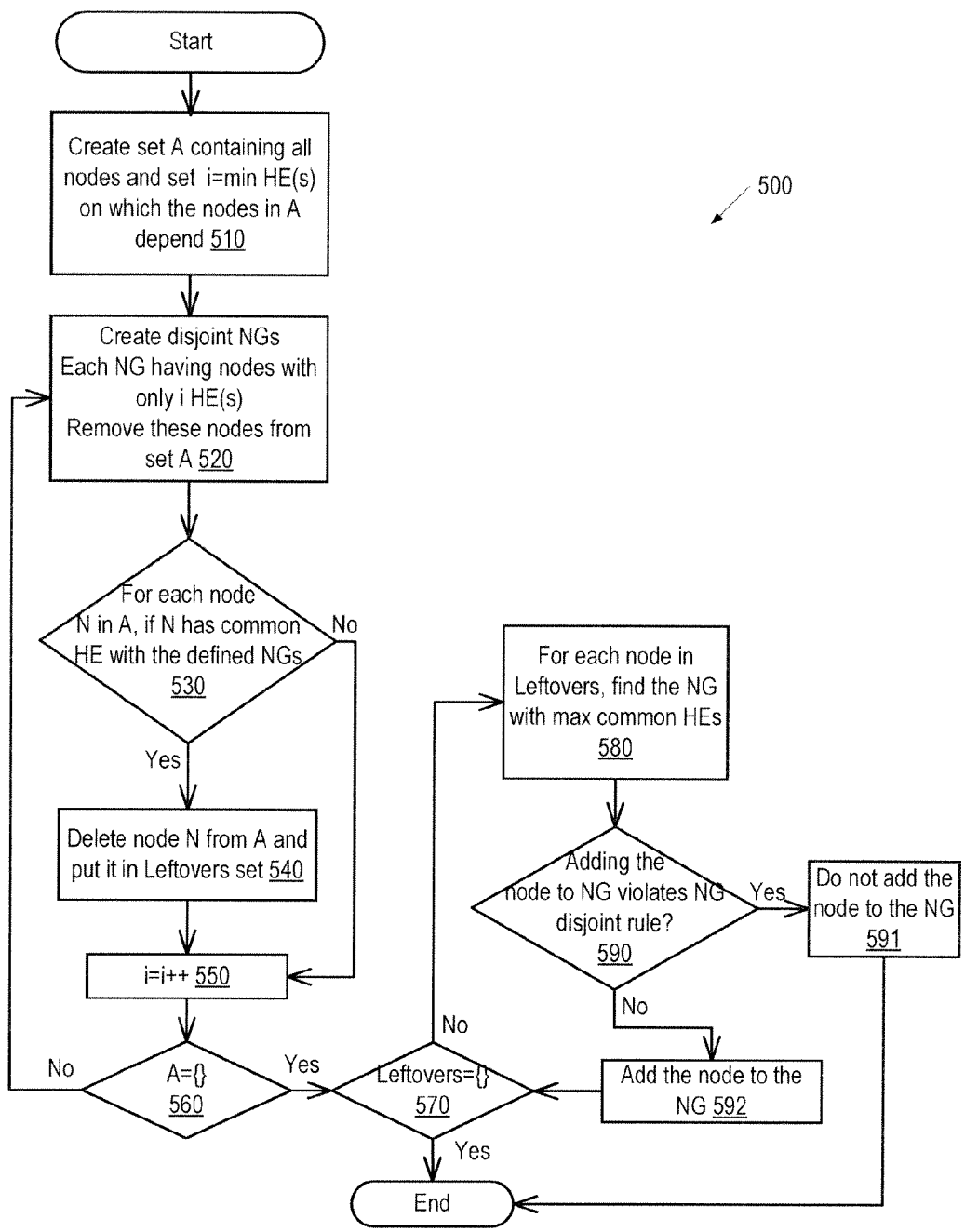
FIG. 5 is a flow diagram illustrating a first method for identifying disjoint node groups according to one embodiment.

FIG. 5 is a flow diagram illustrating a first method 500 for identifying disjoint node groups according to one embodiment. The method 500 starts with initializing a set A containing all of the VMs, and a loop index i is set to the minimum number of HEs on which the VMs in set A depend (block 510). One or more disjoint node groups are created, where each node group contains one or more VMs that depend on i numbers of HEs (block 520). These VMs are then removed from set A.

In the example hardware dependency of FIG. 4, set A is initialized to {V1,V2,V3,V4,V5,V6}. The minimum number of HEs is two, as none of the VMs in set A depend on less than two HEs. The first VM in set A having two HEs (HE1 and HE2) is V1. Thus, V1 is selected into a node group NG1, where NG1(HE1, HE2)={V1}. Further, V4 depends on two HEs (HE4 and HE5), which do not have any HE in common with NG1. Thus, V4 is selected into a node group NG2, where NG2(HE4, HE5)={V4}. Afterwards, V1 and V4 are removed from set A, and A={V2, V3, V5, V6}.

The method 500 proceeds to determine whether any VMs in set A have a common HE with any of the defined NGs (e.g., NG1 and NG2) (block 530); if there is, the VM is removed from set A and placed into a Leftovers set (block 540). Once none of VMs in set A have a common HE with the defined NGs, the method 500 proceeds to increment the loop index i (block 550) and repeats the operations of blocks 520 to 550 until set A becomes empty (block 560).

In the example of FIG. 4, V2 is placed into the Leftovers set as V2 has HE1 in common with V1, and V3 is also placed into the Leftovers set as V3 has HE2 in common with V1. For the same reasons V5 and V6 are also placed into the Leftovers set. V2, V3, V5 and V6 are removed from set A. At this point, NG1(HE1, HE2)={V1}, NG2(HE4, HE5)={V4}, A={ } and Leftovers={V2, V3, V5, V6}.

After the VMs are placed in the Leftovers set, the method 500 proceeds to increment the loop index i (block 550) and repeats the operations of blocks 520 to 550 until set A becomes empty (block 560). That is, the VMs in set A that depend on three or more HEs are placed in previous-formed node groups, new node groups, or in the Leftovers set until set A becomes empty.

When set A becomes empty, the method 500 proceeds to handle the VMs in the Leftovers set. For each VM in the Leftovers set, the method 500 finds the node group with which the VM has the maximum common HEs (block 580), and checks whether adding the VM to that node group violates the node group disjoint rule (block 590). The node group disjoint rule specifies that no two node groups can have any hardware element in common. If adding the VM to a node group violates the node group disjoint rule, such a VM should not be added to the node group (block 591). If adding the VM to that node group does not violate the node group disjoint rule, the VM and its HEs are added to the node group (block 592), and the VM is removed from the Leftovers set. The operations of blocks 580,590,591 and 592 continue until all of the VMs in the Leftover set are processed (block 570).

In this example, V2 have a common HE with both NG1 and NG2, so V2 stays in the Leftover set. V3 has a common HE with NG1 and by adding V3 to NG1 the disjoint rule of node groups is not violated. So V3 is added to NG1 and the addition of V3 brings in HE3 to NG1. V5 have a common HE with both NG1 and NG2, so V5 stays in the Leftover set. V6 has the same HEs as V3, so V6 is also added to NG1.

As a result, NG1(HE1, HE2, HE3)={V1, V3, V6}, NG2 (HE4, HE5)={V4} and Leftovers={V2, V5}. The node groups NG1 and NG2 form a NG-set. The VMs in the Leftovers set cannot be used by the service groups to be configured on the node groups in the NG-set, because using these VMs violate the disjoinness of the node groups and therefore hardware redundancy is not guaranteed. However, service groups that are not configured on the NG-set may use the VMs in the Leftovers set.

The NG-set created from the method 500 can be used to host service units of one or more service groups at the AMF level. In the above example, NG1 and NG2 are disjoint node groups of the NG-set and can be used to ensure hardware redundancy of a service group or service groups configured on the NG-set. Accordingly, the hosting node group attribute of each service unit of a service group is set for each node group of the NG-set.

For a given PLM configuration, different NG-sets may be created using different methods. These different NG-sets can be used for different service groups because hardware separation should be enforced within each service group and not necessarily between service groups. As mentioned previously, creating different NG-sets might not be possible in all cases; in some scenarios, the only other possible NG-set leads to having all nodes in one NG; that is, the resulting NG-set has only one node group which is not desirable.

Figure 6:
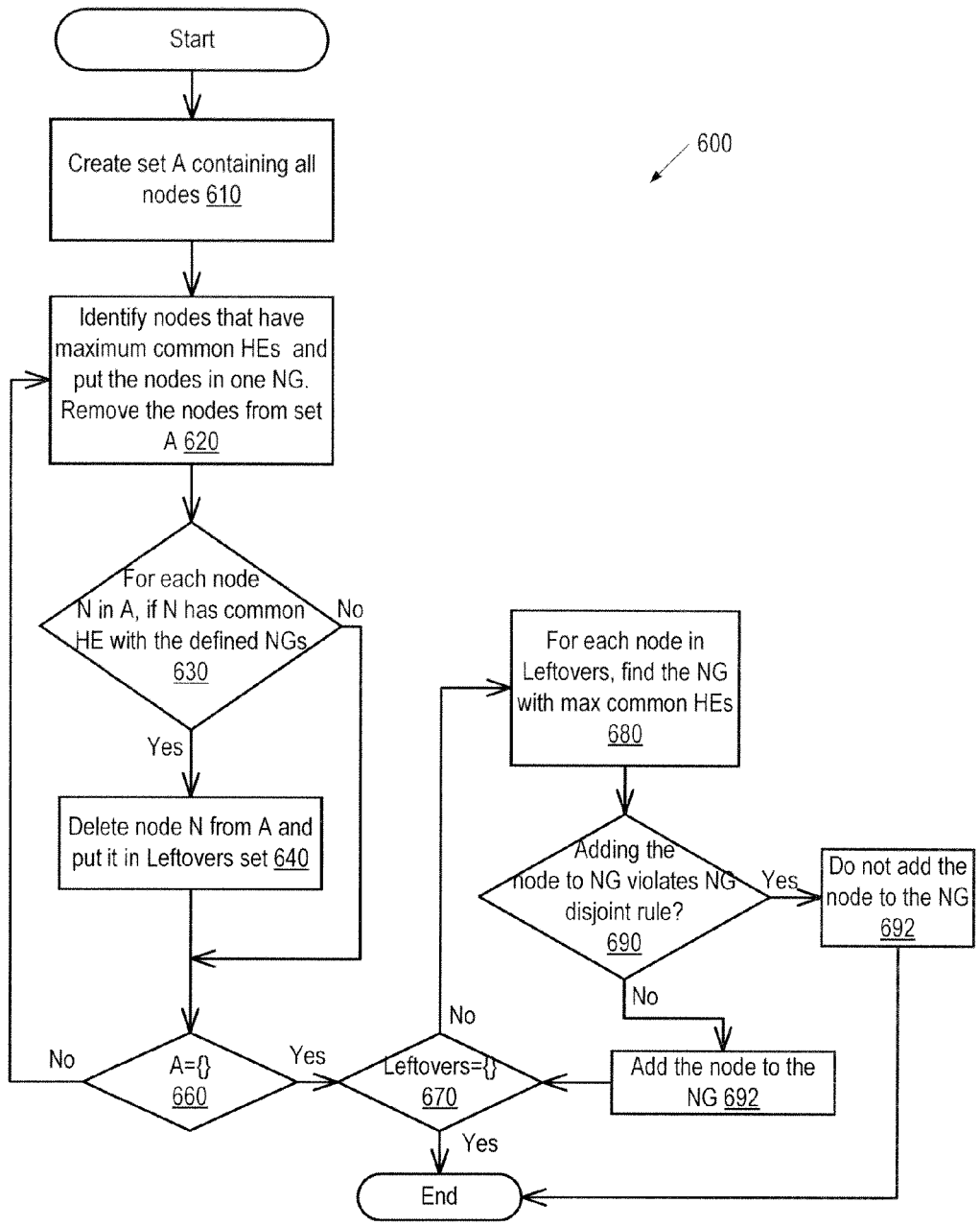
FIG. 6 is a flow diagram illustrating a second method for identifying disjoint node groups according to one embodiment.

FIG. 6 is a flow diagram illustrating a second method 600 for identifying disjoint node groups according to one embodiment. The method 600 starts with initializing a set A containing all VMs (block 610). The VMs that have maximum common HEs are selected into a node group (block 620). The selected VMs are removed from set A.

In the example hardware dependency of FIG. 4, NG1 is created to include V3 and V6 because V3 and V6 share the most common HEs (i.e., HE2 and HE3). Thus, NG1(HE2, HE3)={V3, V6}. At this point, A={V1, V2, V4, V5}.

The method 600 proceeds to determine whether any VMs in set A have a common HE with any of the previously-formed NGs (e.g., NG1) (block 630); if there is, the VM is removed from set A and placed into a Leftovers set (block 640). The operations of blocks 620 to 640 continue until set A becomes empty (block 660).

In the example, V1 and V2 are removed from set A and put in the Leftovers set because V1 has HE2 in common with NG1, and V2 has HE3 in common with NG1. At this point, NG1(HE2,HE3)={V3, V6}, Leftovers={V1, V2} and A={V4, V5}.

Next, V4, V5 have one HE in common (HE4), so a new node group NG2 is created for them. At this point, NG1 (HE2, HE3)={V3, V6}, NG2(HE1, HE4, HE5)={V4, V5}, A={} and Leftovers={V1, V2}.

When set A becomes empty, the method 600 proceeds to handle the VMs in the Leftovers set. The VMs in the Leftovers set are handled in the same way as in method 500. For each VM in Leftovers set, the method 600 finds the node group with which the VM has the maximum common HEs (block 680), and checks whether adding the VM to that node group violates the node group disjoint rule (block 690). If adding the VM to a node group violates the node group disjoint rule, such a VM should not be added to the node group (block 691). If adding the VM to that node group does not violate the node group disjoint rule, the VM and its HEs are added to the node group (block 692), and the VM is removed from the Leftovers set. The operations of blocks 680, 690, 691 and 692 continue until all of the VMs in the Leftover set are processed (block 670).

In the example, V1, V2 cannot be added to NG1 or NG2 because adding them to either node group NG1 or NG2 violates the node group disjoint rule. Therefore, Leftovers={V1, V2} in the end, which means V1 and V2 cannot be utilized.

The node groups (NG1 and NG2) resulted from both method 500 and method 600 are disjoint, and can be used to configure service units that require hardware redundancy. Comparing the results of method 500 and method 600 applied to the hardware dependency table of FIG. 4, it can be seen that different node groups and different Leftover sets can be created from the same PLM configuration. This means that if NG-set1 resulting from method 500 is used for a service group, neither V2 or V5 can be used to configure its service units. Using NG-set2 resulting from method 600 for another service group allows the use V5 for this service group. However, V2 cannot be used for hardware redundancy for either service group.

The NG-set1 resulted from method 500 is: NG1(HE1, HE2,HE3)={V1,V3,V6}, NG2(HE4,HE5)={V4} and Leftovers={V2,V5}.

The NG-set2 resulted from method 600 is: NG1(HE2, HE3)={V3,V6}, NG2(HE1,HE4,HE5)={V4, V5} and Leftovers={V1,V2}.

Figure 7:
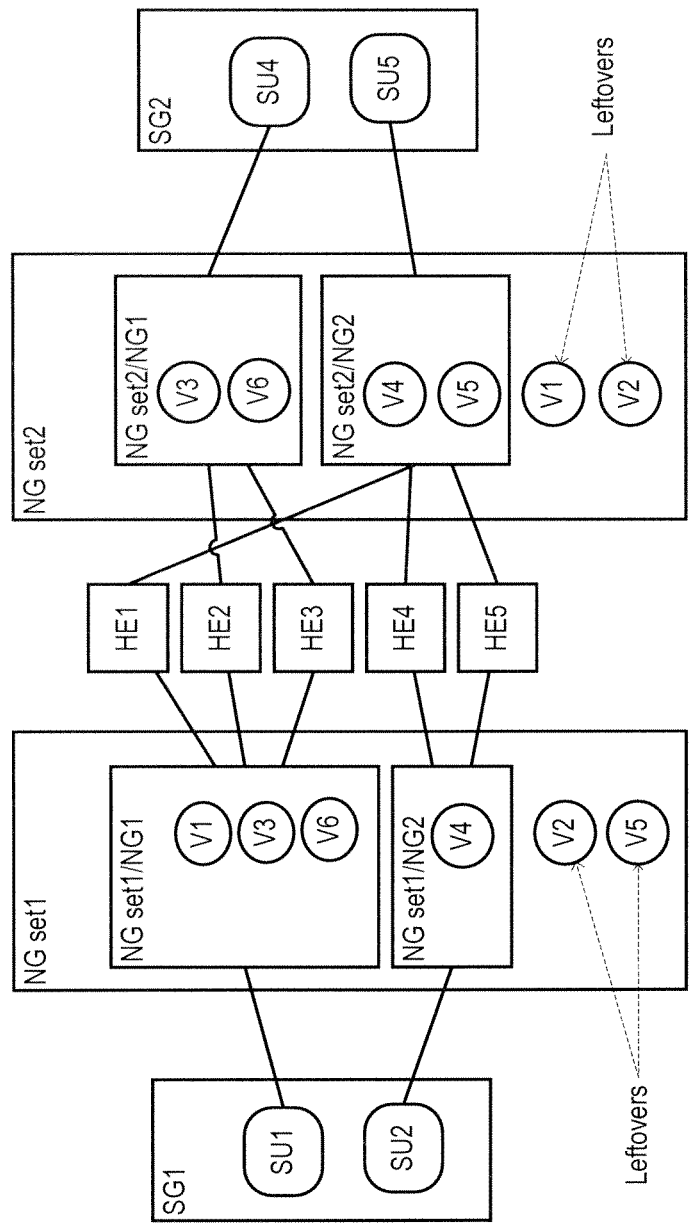
FIG. 7 illustrates how different node group sets can be used for different service groups according to one embodiment.

FIG. 7 illustrates the NG-set1 and NG-set2 based on the results of these two methods. FIG. 7 shows how different NG-sets can be used for different service groups. For clarity the VMs of NG-set1 and NG-set2 are shown separately, but these VMs are the same set of VMs grouped into different node groups for each NG-set. Further, it is shown in FIG. 7 different NG-sets have different Leftoves sets. Having different node groups and Leftover sets in the different NG-sets allows for better utilization of the VMs when these VMs are used to allocate service units of different service groups.

The mapping of a service group to a NG-set and the mapping of a service unit to a node group can be defined in one or more AMF configuration attributes. According to the AMF information model, the object class SaAmfSU has a configuration attribute named saAmfSUHostNodeOrNodeGroup, which specifies either a node or a node group. If a node is specified, the service unit (instantiated from that object class SaAmfSU) can only be instantiated on the node. If a node group is specified, the service unit can only be instantiated on one of the nodes of that node group. If saAmfSUHostNodeOrNodeGroup is not provided, another attribute named saAmfSGSuHostNodeGroup in the SaAmfSG object class can be used analogously. If a node group is configured for a service group, the AMF selects nodes from this node group to instantiate the service units on those nodes for the service group. In one embodiment, the node group configuration attribute (e.g., saAmfSUHostNodeOrNodeGroup or saAmfSGSuHostNodeGroup) of service units is used to ensure the placement of service units of a service group on different hardware.

By configuring these attributes, the service units of each service group can be distributed on disjoint node groups. This way, when the AMF chooses a node of its configured node group to instantiate each service unit in a service group, the service units of that service group are instantiated on different HEs.

Figure 8:
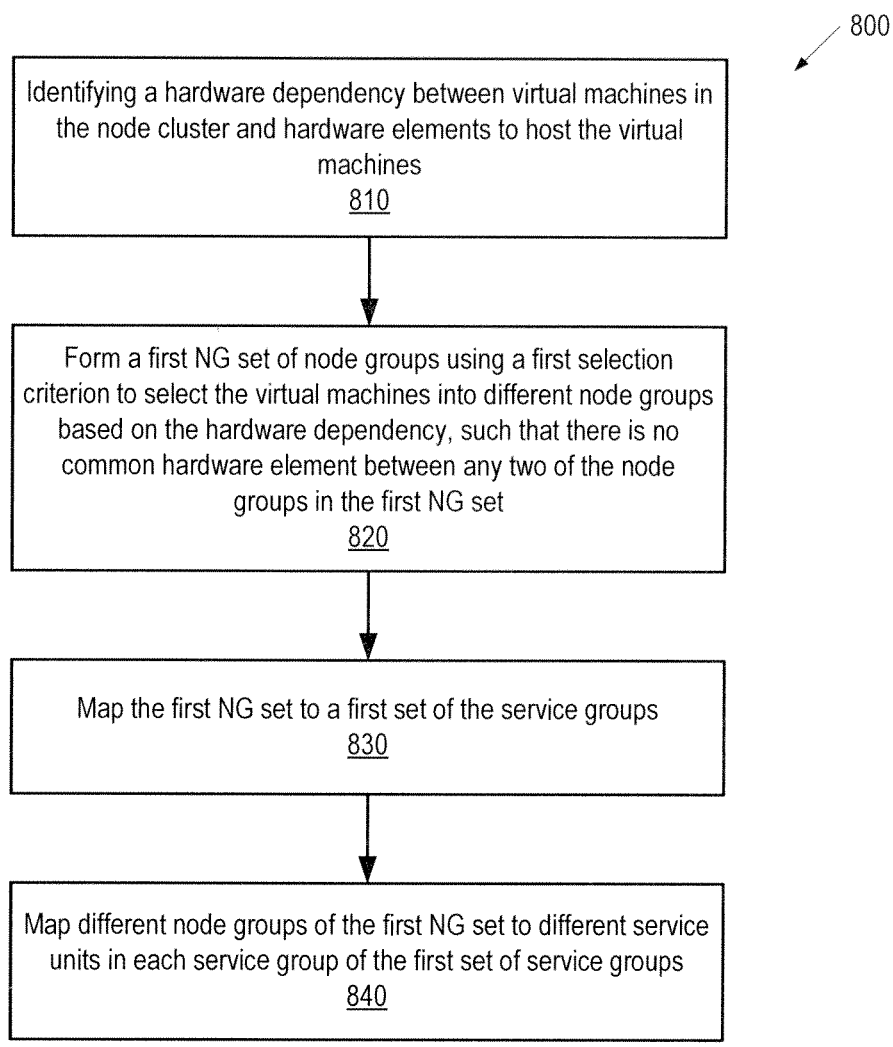
FIG. 8 is a flow diagram illustrating a method for identifying disjoint node groups according to one embodiment.

FIG. 8 illustrates a method 800 for generating disjoint node groups for a node cluster according to one embodiment. The use of disjoint node groups guarantees hardware redundancy for each service group to be configured on the node cluster. Each service group includes service units, and each service unit is a unit of redundancy for services provided and protected by the service group. The method 800 may be performed by a computer system, such as a computer system 900 to be described below with reference to FIG. 9. One or more parts of an embodiment of the invention may be implemented using different combinations of software, firmware, and/or hardware.

The method 800 begins with the computer system identifying a hardware dependency between virtual machines in the node cluster and hardware elements to host the virtual machines (810). A first node group set (NG set) of node groups is formed using a first selection criterion to select the virtual machines into different node groups based on the hardware dependency, such that there is no common hardware element between any two of the node groups in the first NG set (820). The computer system then maps the first NG set to a first set of the service groups (830); and maps different node groups of the first NG set to different service units in each service group of the first set of service groups (840).

In one embodiment, a second NG set of node groups may be formed using a second selection criterion to select the virtual machines into different node groups based on the hardware dependency. The second selection criterion is different from the first selection criterion with respect to characteristics of the hardware dependency used for selecting the virtual machines, such that there is no common hardware element between any two of the node groups in the second NG set. The second NG set is mapped to a second set of the service groups that is non-overlapping with the first set of the service groups. Different node groups of the second NG set are mapped to different service units within each service group in the second set of the service groups.

In one embodiment, additional NG sets may be formed using additional selection criteria different from the first and second selection criteria. For example, an additional selection criterion may be to select the VMs in set A according to the order of the VMs listed in set A. Other selection criteria may also be used.

Figure 9:
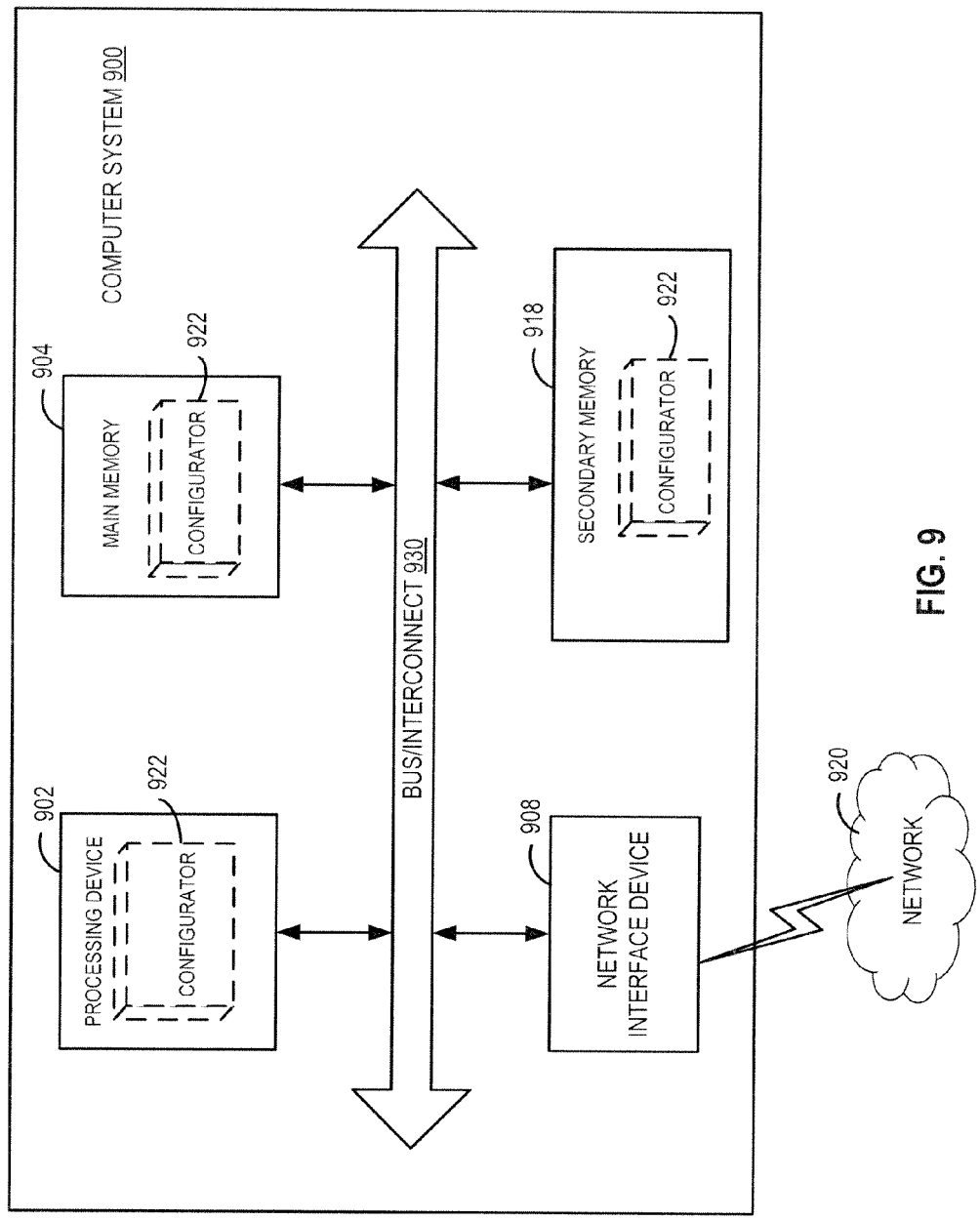
FIG. 9 illustrates a diagrammatic representation of a computer system according to one embodiment.

FIG. 9 illustrates a diagrammatic representation of a machine in the exemplary form of a computer system 900 within which a set of instructions, for causing the machine to perform any one or more of the methodologies discussed herein, may be executed. The computer system 900 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 900 includes a processing device 902. The processing device 902 represents one or more general-purpose processors, each of which can be: a microprocessor, a central processing unit (CPU), a multicore system, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. In one embodiment, the processing device 902 is adapted to execute the operations of a configurator 922 which contains instructions executable by the processor device 902, such that the computer system 900 is operative to execute the methods 500, 600 and/or 800 of FIGS. 5, 6 and 8.

In one embodiment, the processor device 902 is coupled to one or more memory devices such as: a main memory 904 (e.g., read-only memory (ROM), flash memory, dynamic random access memory (DRAM) such as synchronous DRAM (SDRAM) or Rambus DRAM (RDRAM), etc.), a secondary memory 918 (e.g., a magnetic data storage device, an optical magnetic data storage device, etc.), and other forms of computer-readable media, which communicate with each other via a bus or interconnect 930. The memory devices may also different forms of read-only memories (ROMs), different forms of random access memories (RAMs), static random access memory (SRAM), or any type of media suitable for storing electronic instructions. In one embodiment, the memory devices may store the code and data of the configurator 922. In the embodiment of FIG. 9, the configurator 922 may be located in one or more of the locations shown as dotted boxes and labeled by the reference numeral 922.

The computer system 900 may further include a network interface device 908. A part or all of the data and code of the configurator 922 may be transmitted or received over a network 920 via the network interface device 908. Although not shown in FIG. 9, the computer system 900 also may include user input/output devices (e.g., a keyboard, a touch-screen, speakers, and/or a display).

In one embodiment, the configurator 922 can be implemented using code and data stored and executed on one or more computer systems (e.g., the computer system 900). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIGS. 9 as 904 and 918) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the methods of FIGS. 5, 6 and 8 have been described with reference to the exemplary embodiment of FIG. 9. However, it should be understood that the operations of the methods of FIGS. 5, 6 and 8 can be performed by embodiments of the invention other than those discussed with reference to FIG. 9, and the embodiment discussed with reference to FIG. 9 can perform operations different from those discussed with reference to the methods of FIGS. 5, 6 and 8. While the methods of FIGS. 5, 6 and 8 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a computer system adapted to generate disjoint node groups for a node cluster to thereby guarantee hardware redundancy for each of a plurality of service groups to be configured on the node cluster, wherein each service group includes a plurality of service units, and wherein each service unit is a unit of redundancy for services provided and protected by the service group, the method comprising the steps of:
    identifying a hardware dependency between virtual machines in the node cluster and hardware elements to host the virtual machines;
    forming a first node group set (NG set) of node groups using a first selection criterion to select the virtual machines into different node groups based on the hardware dependency, such that there is no common hardware element between any two of the node groups in the first NG set;
    mapping the first NG set to a first set of the service groups; and
    mapping different node groups of the first NG set to different service units in each service group of the first set of the service groups,
    wherein the hardware dependency is defined in a Platform Management (PLM) Service configuration for the node cluster, wherein the PLM configuration specifies a containment relationship between the hardware elements and virtual machine monitors, and a dependency relationship between the virtual machine monitors and the virtual machines that allows migration of the virtual machines at runtime.

2. The method of claim 1, wherein further comprising the step of:
    forming a second NG set of node groups using a second selection criterion to select the virtual machines into different node groups based on the hardware dependency, wherein the second selection criterion is different from the first selection criterion with respect to characteristics of the hardware dependency used for selecting the virtual machines, such that there is no common hardware element between any two of the node groups in the second NG set;
    mapping the second NG set to a second set of the service groups that is non-overlapping with the first set of the service groups; and
    mapping different node groups of the second NG set to different service units within each service group in the second set of the service groups.

3. The method of claim 1, wherein forming the first NG set further comprises the step of: selecting a virtual machine into a node group, wherein the selected virtual machine depends on a minimum number of hardware elements among the virtual machines to be selected.

4. The method of claim 1, wherein forming the first NG set further comprises the step of: selecting at least two virtual machines into a node group, wherein the at least two virtual machines depend on a maximum number of common hardware elements among the virtual machines to be selected.

5. The method of claim 1, further comprising the steps of:
    forming additional NG sets for the node cluster based on the hardware dependency using additional selection criteria different from the first selection criterion; and
    mapping the additional NG sets to additional different ones of the service groups.

6. A method implemented by a computer system adapted to generate disjoint node groups for a node cluster to thereby guarantee hardware redundancy for each of a plurality of service groups to be configured on the node cluster, wherein each service group includes a plurality of service units, and wherein each service unit is a unit of redundancy for services provided and protected by the service group, the method comprising the steps of:
    identifying a hardware dependency between virtual machines in the node cluster and hardware elements to host the virtual machines;
    forming a first node group set (NG set) of node groups using a first selection criterion to select the virtual machines into different node groups based on the hardware dependency, such that there is no common hardware element between any two of the node groups in the first NG set;
    mapping the first NG set to a first set of the service groups;
    mapping different node groups of the first NG set to different service units in each service group of the first set of the service groups; and
    placing a virtual machine that has not yet been selected into a leftovers set if the virtual machine depends on a same hardware element as another virtual machine in a previously-formed node group for a same NG set.

7. The method of claim 6, further comprising the step of: placing each of the virtual machines into one of previously-formed node groups, a newly-formed node group that is disjoint from the previously-formed node groups, or the leftovers set, until all of the virtual machines are placed.

8. The method of claim 6, wherein subsequent to placing the virtual machine into the leftovers set, the method further comprises the step of: adding the virtual machine from the leftovers set into one of previously-formed node groups for the same NG set if disjointness of the previously-formed node groups is not violated.

9. The method of claim 1, wherein mapping the different node groups further comprises the step of: setting an Availability Management Framework (AMF) configuration attribute of each service unit to indicate the mapping between the service unit and one of the node groups.

10. A computer system adapted to generate disjoint node groups for a node cluster to thereby guarantee hardware redundancy for each of a plurality of service groups to be configured on the node cluster, wherein each service group includes a plurality of service units, and wherein each service unit is a unit of redundancy for services provided and protected by the service group, the computer system comprising a processor and a memory, the memory containing instructions executable by the processor whereby the computer system is operative to:
    identify a hardware dependency between virtual machines in the node cluster and hardware elements to host the virtual machines;
    form a first node group set (NG set) of node groups using a first selection criterion to select the virtual machines into different node groups based on the hardware dependency, such that there is no common hardware element between any two of the node groups in the first NG set;
    map the first NG set to a first set of the service groups; and
    map different node groups of the first NG set to different service units in each service group of the first set of the service groups, wherein the hardware dependency is defined in a Platform Management (PLM) Service configuration for the node cluster, wherein the PLM configuration specifies a containment relationship between the hardware elements and virtual machine monitors, and a dependency relationship between the virtual machine monitors and the virtual machines that allows migration of the virtual machines at runtime.

11. The computer system of claim 10, wherein the computer system is further adapted to:
form a second NG set of node groups using a second selection criterion to select the virtual machines into different node groups based on the hardware dependency, wherein the second selection criterion is different from the first selection criterion with respect to characteristics of the hardware dependency used for selecting the virtual machines, such that there is no common hardware element between any two of the node groups in the second NG set;
map the second NG set to a second set of the service groups that is non-overlapping with the first set of the service groups; and
map different node groups of the second NG set to different service units within each service group in the second set of the service groups.

12. The computer system of claim 10, wherein when forming the first NG set, the computer system is further adapted to select a virtual machine into a node group, wherein the selected virtual machine depends on a minimum number of hardware elements among the virtual machines to be selected.

13. The computer system of claim 10, wherein when forming the first NG set, the computer system is further adapted to select at least two virtual machines into a node group, wherein the at least two virtual machines depend on a maximum number of common hardware elements among the virtual machines to be selected.

14. The computer system of claim 10, wherein the computer system is further adapted to:
form additional NG sets for the node cluster based on the hardware dependency using additional selection criteria different from the first selection criterion; and
map the additional NG sets to additional different ones of the service groups.

15. A computer system adapted to generate disjoint node groups for a node cluster to thereby guarantee hardware redundancy for each of a plurality of service groups to be configured on the node cluster, wherein each service group includes a plurality of service units, and wherein each service unit is a unit of redundancy for services provided and protected by the service group, the computer system comprising a processor and a memory, the memory containing instructions executable by the processor whereby the computer system is operative to:
identify a hardware dependency between virtual machines in the node cluster and hardware elements to host the virtual machines;
form a first node group set (NG set) of node groups using a first selection criterion to select the virtual machines into different node groups based on the hardware dependency, such that there is no common hardware element between any two of the node groups in the first NG set;
map the first NG set to a first set of the service groups;
map different node groups of the first NG set to different service units in each service group of the first set of the service groups; and
place a virtual machine that has not yet been selected into a leftovers set if the virtual machine depends on a same hardware element as another virtual machine in a previously-formed node group for a same NG set.

16. The computer system of claim 15, wherein the computer system is further adapted to place each of the virtual machines into one of previously-formed node groups, a newly-formed node group that is disjoint from the previously-formed node groups, or the leftovers set, until all of the virtual machines are placed.

17. The computer system of claim 15, wherein subsequent to placing the virtual machine into the leftovers set, the computer system is further adapted to add the virtual machine from the leftovers set into one of previously-formed node groups for the same NG set if disjointness of the previously-formed node groups is not violated.

18. The computer system of claim 10, wherein the computer system is further adapted to set an Availability Management Framework (AMF) configuration attribute of each service unit to indicate the mapping between the service unit and one of the node groups.

* * * * *